US011491961B2

(12) United States Patent
Arienti et al.

(10) Patent No.: US 11,491,961 B2
(45) Date of Patent: Nov. 8, 2022

(54) INTEGRATED MASTER-CYLINDER FOR BRAKE-BY-WIRE BRAKING SYSTEM AND BRAKE-BY-WIRE BRAKING SYSTEM WITH THE SAME

(71) Applicant: FRENI BREMBO S.P.A., Curno (IT)

(72) Inventors: Roberto Arienti, Curno (IT); Andrea Odoni, Curno (IT); Massimo Gualandris, Curno (IT); Carlo Cantoni, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 286 days.

(21) Appl. No.: 16/617,176

(22) PCT Filed: Apr. 26, 2018

(86) PCT No.: PCT/IB2018/052900
§ 371 (c)(1),
(2) Date: Nov. 26, 2019

(87) PCT Pub. No.: WO2018/220453
PCT Pub. Date: Dec. 6, 2018

(65) Prior Publication Data
US 2020/0122706 A1    Apr. 23, 2020

(30) Foreign Application Priority Data

May 29, 2017   (IT) .................. 102017000057996

(51) Int. Cl.
*B60T 11/16*   (2006.01)
*B60T 13/62*   (2006.01)
(Continued)

(52) U.S. Cl.
CPC .............. *B60T 13/62* (2013.01); *B60T 7/042* (2013.01); *B60T 7/12* (2013.01); *B60T 8/4081* (2013.01);
(Continued)

(58) Field of Classification Search
CPC ...... B60T 8/4072; B60T 8/4081; B60T 11/16; B60T 11/20; B60T 13/145; B60T 13/146; B60T 13/165; B60T 13/166; B60T 13/745
See application file for complete search history.

(56) References Cited

U.S. PATENT DOCUMENTS 3,044,265 A  *  7/1962  Schwartz ............... F15B 17/00
                                                    60/548
4,382,364 A  *  5/1983  Thomas ................ B60T 13/148
                                                    417/390
(Continued)

FOREIGN PATENT DOCUMENTS

CN      203766749 U    8/2014
DE    102006040424 A1   3/2008
(Continued)

OTHER PUBLICATIONS

European Patent Office, International Search Report with Written Opinion, dated Jul. 13, 2018, issued in PCT/IB2018/052900, European Patent Office, Rijswijk, Netherlands.

*Primary Examiner* — Bradley T King
(74) *Attorney, Agent, or Firm* — Marshall & Melhorn, LLC

(57) ABSTRACT

A braking system with a brake pump are described. The brake pump may have a first and a second delivery circuit fluidically connectable to at least a first and a second braking device. The first delivery circuit may have an indirect stage fluidically connectable to the first braking device and a direct stage intercepted by a first control valve, fluidically connectable alternately to a braking simulator and to the at least one second braking device. The second delivery circuit may be intercepted by the first control valve so as to actuate the second braking device alternately to the direct stage of the first delivery circuit.

18 Claims, 5 Drawing Sheets

(51) Int. Cl.
  *B60T 7/04*   (2006.01)
  *B60T 7/12*   (2006.01)
  *B60T 8/40*   (2006.01)
  *B60T 13/18*  (2006.01)
  *B60T 13/68*  (2006.01)
(52) U.S. Cl.
  CPC ............ *B60T 13/18* (2013.01); *B60T 13/686* (2013.01); *B60T 2270/402* (2013.01); *B60T 2270/404* (2013.01); *B60T 2270/82* (2013.01)

(56) References Cited

U.S. PATENT DOCUMENTS

| | | | | |
|---|---|---|---|---|
| 4,815,793 | A * | 3/1989 | Reinartz | ................. B60T 8/341 |
| | | | | 303/113.3 |
| 8,342,615 | B2 | 1/2013 | Drumm | |
| 8,936,322 | B2 | 1/2015 | Klimes et al. | |
| 9,421,954 | B2 * | 8/2016 | Cadeddu | .................... B60T 8/46 |
| 10,407,038 | B2 | 9/2019 | Kobayashi | |
| 2008/0265665 | A1 | 10/2008 | Drumm | |
| 2013/0318963 | A1 * | 12/2013 | Masuda | ................ B60T 13/147 |
| | | | | 60/591 |
| 2015/0000266 | A1 * | 1/2015 | Murayama | ............ B60T 13/146 |
| | | | | 60/591 |
| 2015/0344013 | A1 | 12/2015 | Knechtges et al. | |
| 2016/0016568 | A1 | 1/2016 | Ishida et al. | |
| 2016/0121868 | A1 * | 5/2016 | Nimura | ................. B60T 13/662 |
| | | | | 303/6.01 |
| 2017/0137009 | A1 | 5/2017 | Arienti et al. | |
| 2018/0043873 | A1 * | 2/2018 | Tanimoto | ................ B60T 8/246 |
| 2018/0162332 | A1 | 6/2018 | Nakazawa et al. | |
| 2019/0009763 | A1 * | 1/2019 | Arienti | ................. B60T 8/4081 |
| 2020/0406880 | A1 * | 12/2020 | Zimmermann | ........... B60T 7/12 |

FOREIGN PATENT DOCUMENTS

| | | |
|---|---|---|
| DE | 102013205639 A1 | 10/2014 |
| DE | 102014212536 A1 | 12/2015 |
| EP | 2883766 A1 | 6/2015 |
| GB | 2508437 A | 6/2014 |
| WO | 2006/087338 A1 | 8/2006 |
| WO | 2014/095286 A1 | 6/2014 |
| WO | 2016/001809 A1 | 1/2016 |
| WO | 2016/208303 A1 | 12/2016 |

\* cited by examiner

INTEGRATED MASTER-CYLINDER FOR BRAKE-BY-WIRE BRAKING SYSTEM AND BRAKE-BY-WIRE BRAKING SYSTEM WITH THE SAME

SCOPE

The present invention concerns an integrated brake pump for brake-by-wire braking systems and a vehicle brake-by-wire braking system thereof.

STATE OF THE ART

In particular, the popularity of increasingly powerful kinetic energy recovery systems (KERS) on racing cars has made it necessary to provide systems capable of automatically "mixing" regenerative braking and dissipative braking. Regenerative braking is the system that makes it possible to recover energy during braking, converting the kinetic energy lost by the vehicle into electrical energy to be recovered and/or stored; dissipative braking, on the other hand, is the "traditional" system that consists in converting/dissipating the vehicle's kinetic energy into thermal energy, i.e. heat, of the braking devices, such as typically disc brake calipers, brake pads and discs.

Such systems operate the actuation of the traditional (or dissipative) braking system by means of "Brake-By-Wire" actuators: in other words, the user does not directly command the braking devices by directly actuating a lever or pedal that pressurizes the system fluidically connected to such braking devices; rather, the braking requested by the user, exerted by the actuation of a lever or pedal, is read and converted into the corresponding actuation of the braking devices by the relative actuators.

The reduced actuation times (0.1-0.2 s to reach the maximum pressure in the braking system) mean that these actuators require high instantaneous power but also low mean power on the track lap (when talking about racing cars).

Moreover, being in the racing environment, the mass of the actuator also plays a fundamental role and must be as limited as possible.

PRESENTATION OF THE INVENTION

In known solutions, therefore, still in the field of racing cars, the need for high instantaneous power and low supply voltages leads to having electrical components of large size and high mass, which are not suitable for competitive applications.

A clear technical contradiction therefore remains: to achieve the required performance, the mass of the components is too great, whereas to achieve an acceptable mass, the components are unable to guarantee the required actuation power.

The need to solve the drawbacks and limitations mentioned in reference to the prior art is therefore perceived, i.e. the need is perceived to provide a braking system that guarantees high power, reduced actuation times and, at the same time, components having low mass in order not to compromise the performance of the vehicles to which such system is applied.

In addition, it is necessary to reduce as much as possible the overall dimensions of the components of the braking system in view of the very small spaces available in a racing vehicle.

Moreover, braking systems with automatic control, for obvious safety reasons, must always ensure maximum efficiency and reliability also in the event of malfunction of the automatic control and/or the electrical circuit. Therefore, there is also a need to provide a braking system that always guarantees reliability and correct braking even in the event of an electrical malfunction.

Such requirements are met by an automated control braking system for vehicles in accordance with claim 1.

In particular, this requirement is satisfied by a brake pump for braking systems of vehicles having a pump body comprising:

- a first and a second delivery circuit fluidically connectable to at least a first and a second braking device,
- wherein the first delivery circuit comprises an indirect stage fluidically connectable to the first braking device and a direct stage intercepted by a first control valve, fluidically connectable alternately to a braking simulator and to said at least one second braking device, so as to alternately connect the direct stage to the braking simulator or to said at least one second braking device for the actuation thereof,
- the second delivery circuit is intercepted by said first control valve so as to actuate the second braking device alternately to the direct stage of the first delivery circuit,
- the pump body having an input connection to a hydraulic actuation circuit traversed by an actuation fluid different from said brake fluid and fluidically separated therefrom,
- wherein the pump body houses a first and a second float, operatively connectable, in input, to a manual actuation device and fluidically connected in output respectively to the direct and indirect stages of the first delivery circuit,
- wherein the pump body houses a third float operatively connected, in input, to the input connection of the hydraulic actuation circuit and, in output, to the second delivery circuit.

According to one embodiment, the first and the second float are in series with each other and movable according to a respective first and second actuation stroke parallel to an axial direction.

According to one embodiment, the third float is movable along a third actuation stroke parallel to an axial direction and offset with respect to a first and a second actuation stroke of the first and second float.

According to one embodiment, the first float has a first pump head housed so as to slide within a first delivery volume of the pump body, the second float is provided with a second pump head housed so as to slide within a second delivery volume of the pump body, said first and second delivery volumes being fluidically separated from each other, the first and the second pump heads being in series with each other.

According to one embodiment, the pump body delimits an actuation chamber, fluidically connected in input to the hydraulic actuation circuit and housing an actuation head of the third float mechanically connected to a third pump head of the third float, the third pump head being housed in a third delivery volume of the pump body connected in output to the second delivery circuit.

According to one embodiment, the actuation chamber and the third delivery volume are fluidically separated from each other and filled with different fluids.

According to one embodiment, the actuation chamber is fluidically separated from the first and second delivery volumes of the pump body.

According to one embodiment, the first control valve comprises a diverter device which alternately and exclusively connects the direct stage of the first delivery circuit to the braking simulator or to the second braking device.

According to one embodiment, the second delivery circuit comprises a third control valve which commands the first control valve.

The present invention also relates to a braking system of vehicles comprising a brake pump provided with a first and a second delivery circuit, containing the same brake fluid,
at least a first and a second braking device,
a closed branch, disconnected from said braking devices, wherein the indirect stage of the first delivery circuit is fluidically connected to the first braking device and the direct stage is intercepted by the first control valve fluidically connected alternately to the closed branch and to said at least one second braking device so as to alternately connect the direct stage to the closed branch or to said at least one second braking device for the actuation thereof,
an automatic hydraulic actuation unit operatively connected to the brake pump by means of a hydraulic actuation circuit traversed by an actuation fluid different from said brake fluid and fluidically separated therefrom,
at least one control unit of the braking system which supervises the operation of the braking system, wherein
the first float of the pump body is operatively connected, in input, to a manual actuation device, the first and the second float being fluidically connected, in output, respectively to the direct and indirect stages of the first delivery circuit.

According to one embodiment, the first control valve is operatively connected to the control unit and is commanded thereby so that, in an automatic operating condition, the pressurized brake fluid in the direct stage of the first delivery circuit is sent to said closed branch, fluidically disconnecting the direct stage from the second braking device.

According to one embodiment, the first control valve is operatively connected to the control unit and commanded thereby so that, in a manual operating condition, the pressurized brake fluid in the direct stage of the first delivery circuit is sent to said second braking device, by-passing the braking simulator.

According to one embodiment, the automatic hydraulic actuation unit comprises a high-pressure pump suitable to pressurize the actuation fluid to a pressure at least double the pressure inside the direct and indirect stages of the first delivery circuit to actuate the third float.

According to one embodiment, the automatic hydraulic actuation unit comprises a second control valve operatively connected to the control unit and commanded therefrom in order to control the movement of the third float, generating the pressure required in the third delivery volume.

According to one embodiment, the closed branch terminates in a braking simulator equipped with a hydraulic pressure sensor operatively connected to the control unit so as to signal to the latter the request for braking action by a user.

According to one embodiment, said braking simulator comprises a hydraulic fluid accumulator tank and elastic means for elastically opposing the first actuation stroke of the first float.

According to one embodiment, the second delivery circuit comprises a third control valve, operatively connected to the control unit and commanded thereby so as to command the diverter device.

According to one embodiment, the first and second delivery circuits are fluidically connected to a pair of first braking devices arranged on a first vehicle axle and to a pair of second braking devices arranged on a second vehicle axle, respectively.

DESCRIPTION OF THE FIGURES

Further features and advantages of the present invention will become more comprehensible from the following description of its preferred and non-limiting embodiments, wherein.

Figure 1:
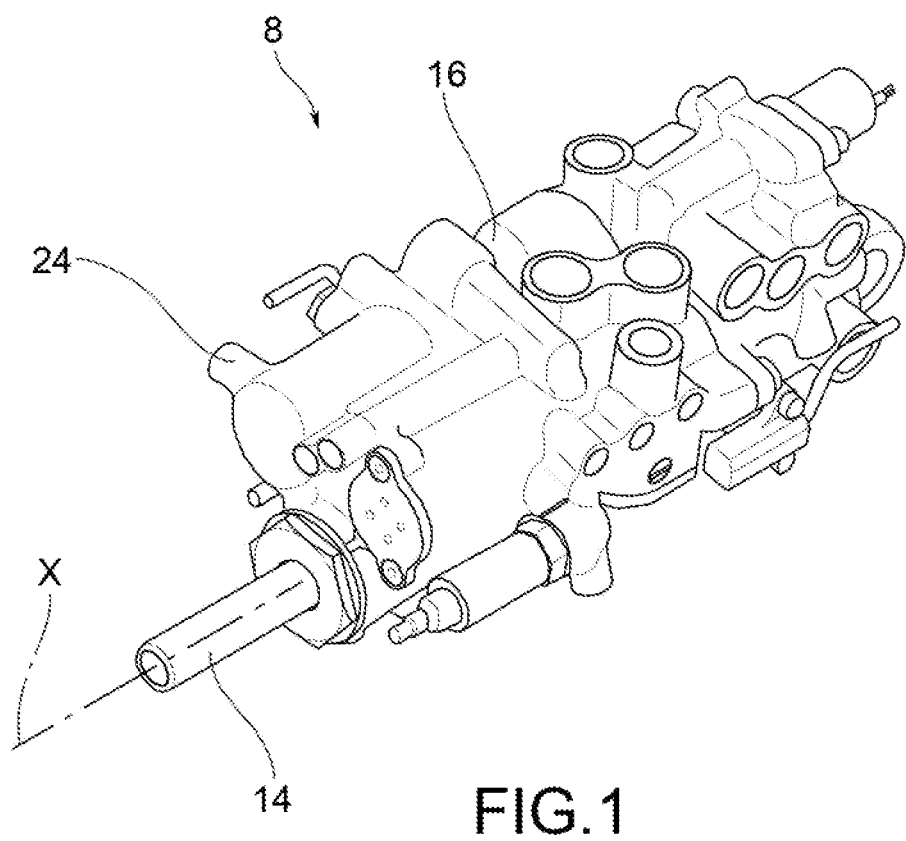
FIGS. 1-2 show perspective views, from different angles, of a brake pump for a braking system of vehicles according to an embodiment of the present invention.
Figure 2:
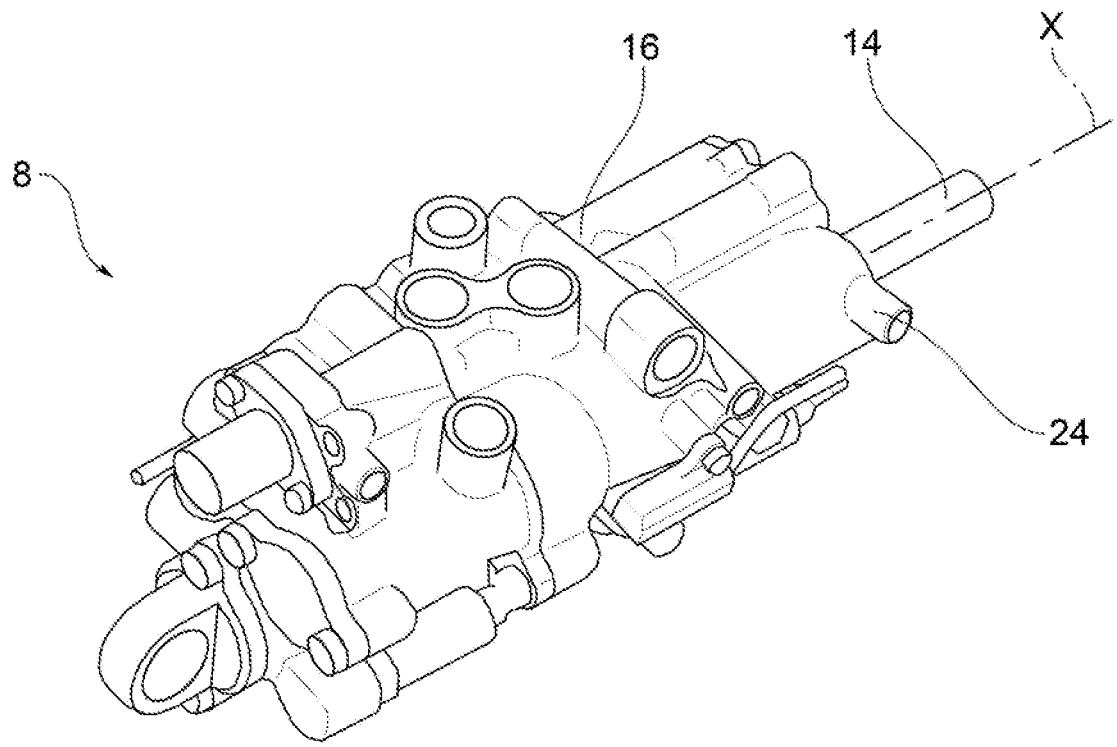
Figure 3:
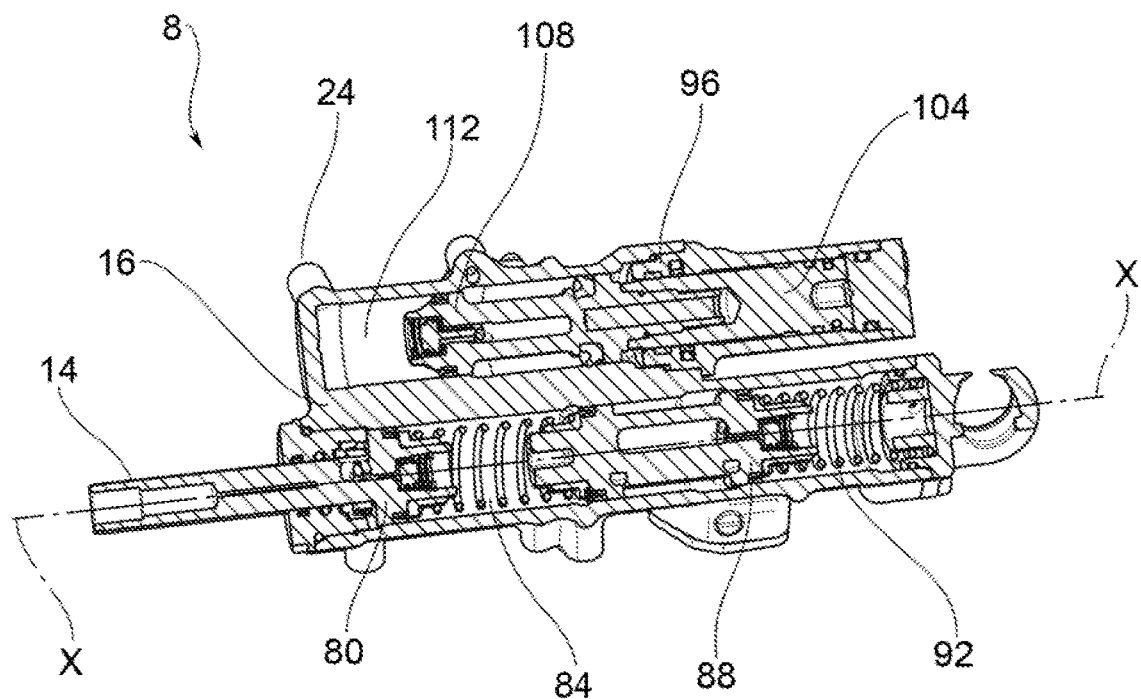
FIGS. 3-4 show perspective views in cross section, along different sectional planes, of the brake pump for the braking system of vehicles shown in FIG. 1.
Figure 4:
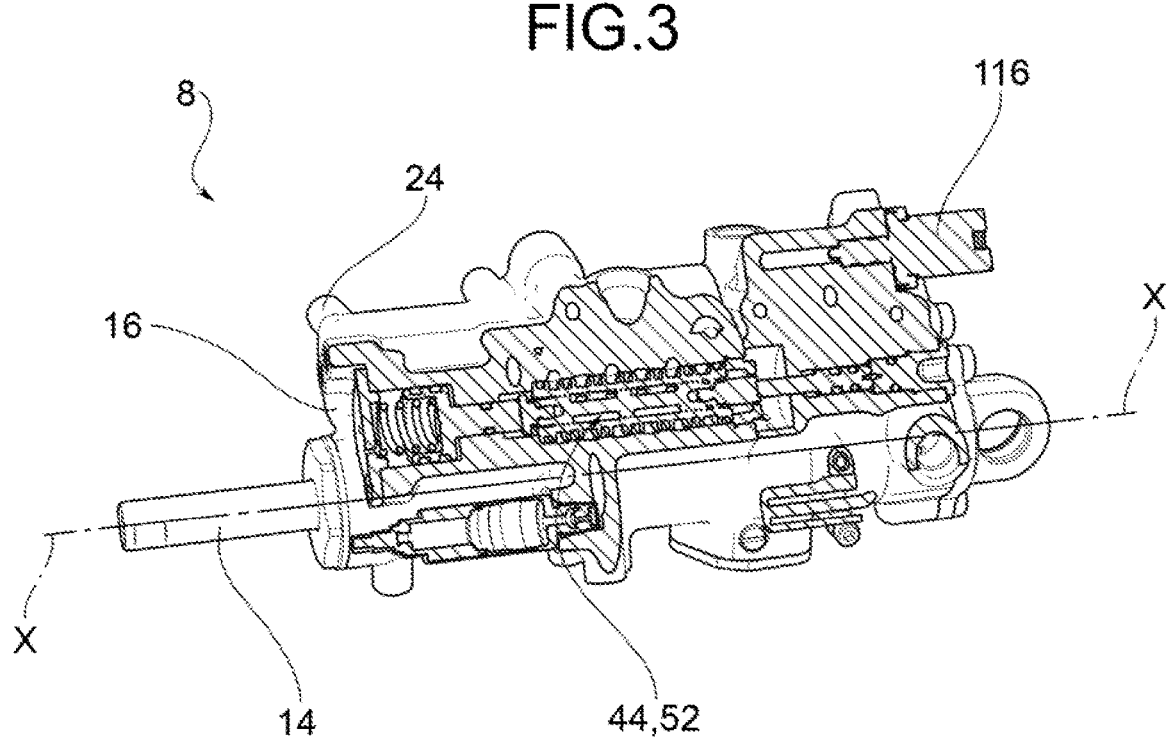
Figure 5:
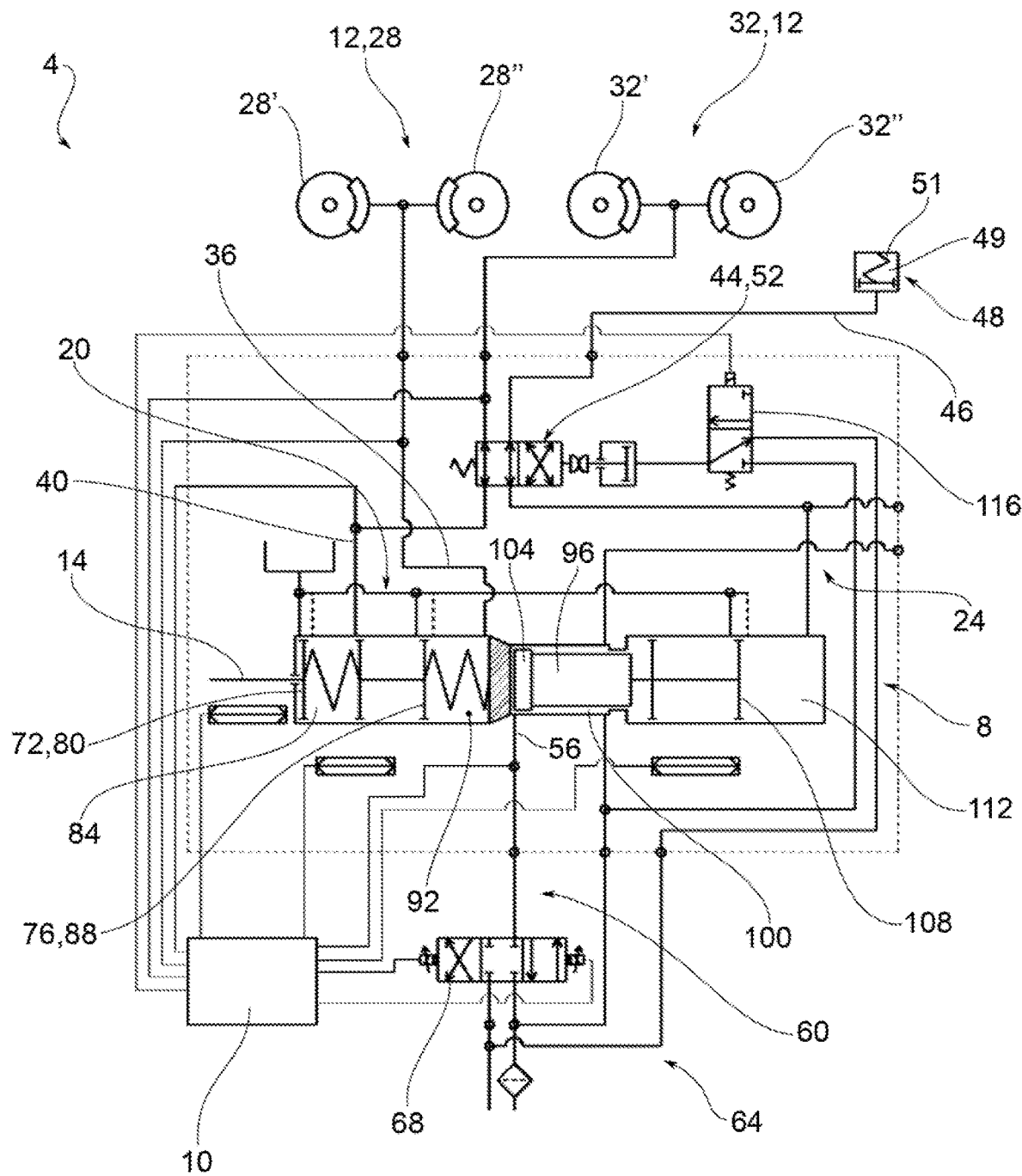
FIG. 5 shows a schematic view of a braking system of vehicles according to the present invention.

The elements or parts of elements in common between the embodiments described hereinafter will be indicated at the same numerical references.

DETAILED DESCRIPTION

With reference to the aforementioned figures, a braking system of vehicles is generally indicated at 4.

First of all, for the purpose of this invention, it should be specified that vehicles are generally understood to mean motor vehicles of any type, size and power, with two, three, four or more wheels, as well as two or more axles thereof; it is also clear that the present invention refers preferably, even if not exclusively, to high-performance, four-wheel vehicles, as explained in the introductory part.

The braking system for vehicles 4 comprises a brake pump 8 and a plurality of braking devices 12.

For the purposes of the present invention, the type of the braking device 12 employed is irrelevant, the type of braking devices that may be employed being, preferably but not exclusively, fixed or floating type disc brake calipers in a one-piece structure or two half-calipers bound together, and so on.

The braking system 4 comprises in particular at least one first braking device 28 and at least one second braking device 32, which are different from each other.

The braking system shall comprise at least one control unit 10 of the braking system which supervises the operation of the braking system, as further described hereinafter.

The braking system shall further comprise at least one manual actuation device 14, which may comprise, for example, an actuation lever or pedal, or even a button in a known manner.

The brake pump 8 comprises a pump body 16 provided with a first and a second delivery circuit 20,24, containing the same brake fluid and fluidically connected to at least a first and a second braking device 28,32 so as to be able to actuate the latter.

Preferably, the first and the second delivery circuits 20,24 are fluidically connected to a pair of first braking devices 28',28" arranged on a first axle of the vehicle and to a pair of second braking devices 32',32" arranged on a second axle of the vehicle, respectively.

For example, the brake fluid in the first delivery circuit 20 and in the second delivery circuit 24 is a typical brake fluid known in the art, preferably, having characteristics for use in high-performance systems. Such brake fluid is of a synthetic type, characterized by high hygroscopicity and high resistance to the formation of bubbles to prevent fading phenomena. Such fluid ensures high reliability in the actuation of braking devices 12,28,32.

The first delivery circuit 20 comprises an indirect stage 36 fluidically connectable to the first braking device 28 and a direct stage 40 which is intercepted by a first control valve 44.

The first control valve 44 is fluidically connectable alternately to a closed branch 46, disconnected from said braking devices 12,28,32, and to said at least one second braking device 32, so as to connect alternately the direct stage 40 to the closed branch 46 or to said at least one second braking device 32 for the actuation thereof.

Said closed branch 46, fluidically disconnected from said braking devices 12,28,32, may, for example, end in a braking simulator 48, as better described below.

For example, the first control valve 44 includes a diverter device 52 which alternately and exclusively connects the direct stage 40 of the first delivery circuit 20 to the closed branch 46, or to the braking simulator 48, if present, or to the braking device 12.

The second delivery circuit 24 is intercepted by said first control valve 44 so as to actuate the second braking device 32 alternately to the direct stage 40 of the first delivery circuit 20.

In other words, the first control valve 44 may connect the second braking device 32 to the direct stage 40 of the first delivery circuit 20, in which case the same first control valve 44 hydraulically disconnects the second delivery circuit 24 from said second braking device 32; or, the first control valve 44 may connect the second braking device 32 to the second delivery circuit 24, in which case it hydraulically disconnects the direct stage 40 of the first delivery circuit 20 from said second braking device 32 and connects the direct stage 40 to the closed branch 46, or to the braking simulator 48, if present.

According to one embodiment, the braking simulator is provided with a pressure transducer or pressure sensor operatively connected to the control unit 10 so as to signal to the latter the request for braking action by a user.

In such condition, the function of the braking simulator 48 is to enable a determined actuation stroke to be achieved by the user-actuated manual actuation device 14 as well as to give the user a gradually increasing feeling of resistance so as to allow the user to modulate the desired braking, as in a traditional braking system.

For example, for this purpose, the braking simulator 48 may comprise an accumulator tank 49 of hydraulic fluid and related elastic means 51 to create an elastic return action.

According to one embodiment, the braking simulator is a hydraulic accumulator suitable to receive and store the brake fluid received from the direct stage 40 of the first delivery circuit 20.

The pump body 16 has an input connection 56 to a hydraulic actuation circuit 60 traversed by an actuation fluid different from said brake fluid and fluidically separated therefrom.

The actuation fluid of the hydraulic actuation circuit 60 is preferably a mineral fluid particularly suitable to work with very high pressures, on the order of a few hundred bar.

It is to be noted that the system may comprise an automatic hydraulic actuation unit 64 operatively connected to the brake pump 8 by means of a hydraulic actuation circuit 60 traversed by an actuation fluid different from said brake fluid and fluidically separated therefrom.

According to one possible embodiment, the automatic hydraulic actuation unit 64 comprises a high-pressure pump suitable to pressurize the actuation fluid at a pressure approximately double the pressure inside the direct 40 and indirect 36 stages of the first delivery circuit 20.

According to one embodiment of the present invention, the automatic hydraulic actuation unit 64 comprises an auxiliary circuit of the vehicle for commanding auxiliary devices of the same vehicle. Such auxiliary devices may comprise both vehicle accessories such as, for example, a propulsion unit distribution actuation system, propulsion unit supply systems, and the like.

For example, in some categories of "Top Racing" vehicles (e.g. F1), the cars are equipped with a high-pressure hydraulic system that may be used as a power generation unit for the actuation of the braking devices.

In other categories, due to design or regulatory choices, the high-pressure hydraulic system may not be present on the vehicle and the actuation may be carried out using electrical systems, in particular electro-hydraulic systems.

For example, according to a possible embodiment, the automatic hydraulic actuation unit 64 may comprise at least one motor operatively connected to a pump for pressurizing the actuation fluid. The motor may also be replaced by a power take-off operatively connected, for example, to a drive shaft or auxiliary shaft of the propulsion unit of the associable vehicle whereon the braking system 4 is mounted.

Preferably, said automatic hydraulic actuation unit 64 is an electro-hydraulic unit, wherein the motor is an electric motor.

The pump body 16 houses a first and a second float 72,76, wherein the first float 72 is operatively connectable, in input, to said manual actuation device 14.

Moreover, the first and the second float 72,76 are fluidically connected in output respectively to the direct 40 and indirect 36 stages of the first delivery circuit 20.

Preferably, the first and the second float 72,76 are in series with each other and movable according to a respective first and second actuation stroke parallel to an axial direction X-X.

The first float 72 is equipped with a first pump head 80 housed so as to slide in a first delivery volume 84 of the pump body 16.

The second float 76 is equipped with a second pump head 88 housed so as to slide in a second delivery volume 92 of the pump body 16.

Said first and second delivery volumes 84,92 are fluidically separated from each other; the first and the second pump head 80,88 are in series with each other.

The pump body 16 houses a third float 96 operatively connected, in input, to the input connection 56 of the hydraulic actuation circuit 60 and, in output, to the second delivery circuit 24.

The third float 96 is movable along a third actuation stroke parallel to an axial direction X-X and offset with respect to a first and a second actuation stroke of the first and second float 72,76.

According to one embodiment, the pump body 16 delimits an actuation chamber 100, fluidically connected in input to the hydraulic actuation circuit 60 and housing an actuation head 104 of the third float 96 mechanically connected to a third pump head 108 of the third float 96.

The third pump head 108 is housed in a third delivery volume 112 of the pump body 16 connected in output to the second delivery circuit 24.

The automatic hydraulic actuation unit 64 comprises a second control valve 68 operatively connected to the control unit 10 and commanded thereby in order to control the movement of the third float 96, generating the required pressure in the third delivery volume 112.

The actuation chamber 100 and the third delivery volume 112 are fluidically separated from each other and filled with different fluids.

The actuation chamber 100 is fluidically separated from the first and second delivery volumes 84,92 of the pump body 16.

According to one embodiment, the second delivery circuit 24 comprises a third control valve 116, operatively connected to the control unit 10 and commanded thereby so as to control the diverter device 52.

The operation of a brake pump and of a related braking system according to the present invention will now be described.

Figure 6:
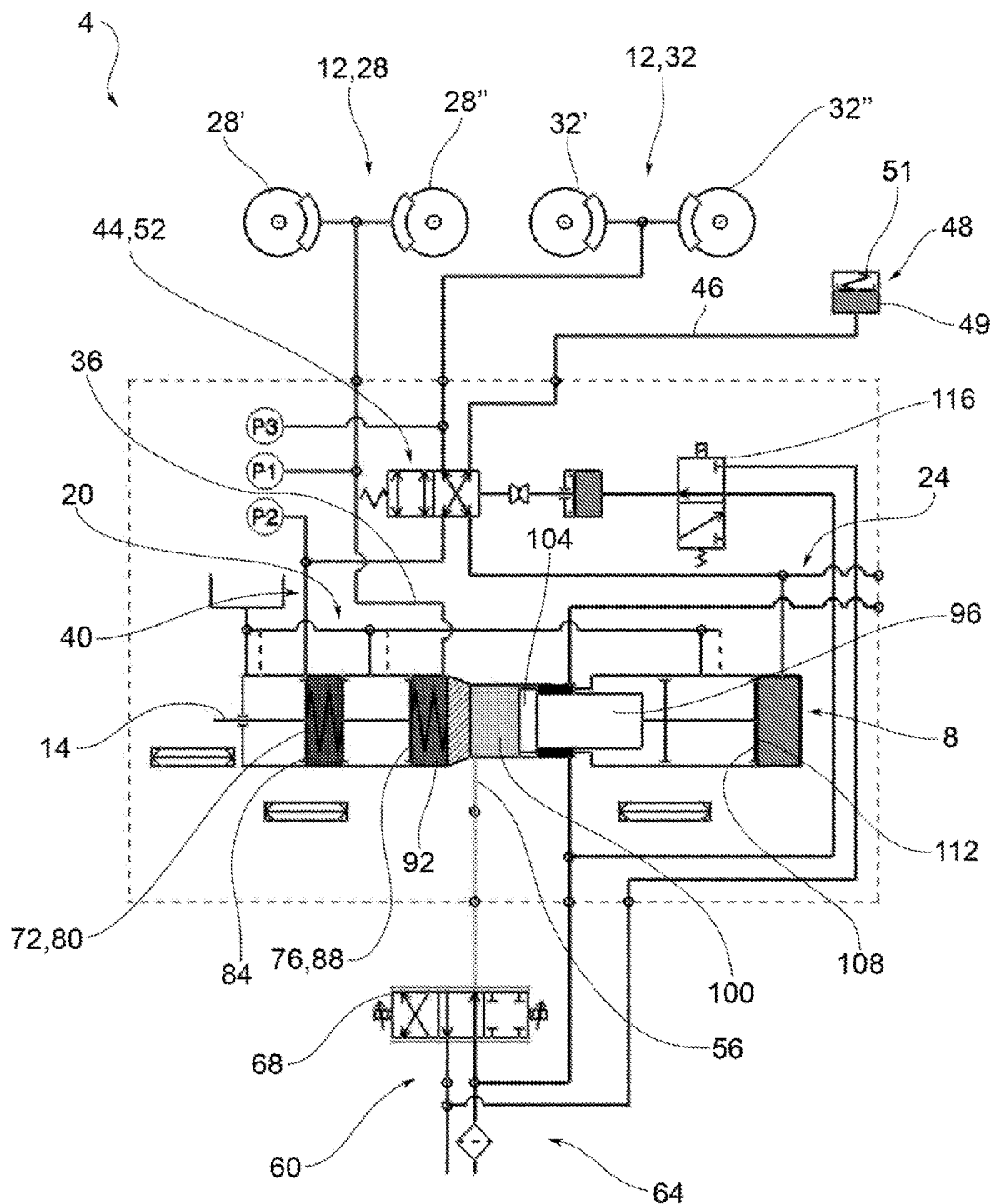
FIG. 6 shows a schematic view of a braking system of vehicles according to the present invention, in an automatic operating configuration.
Figure 7:
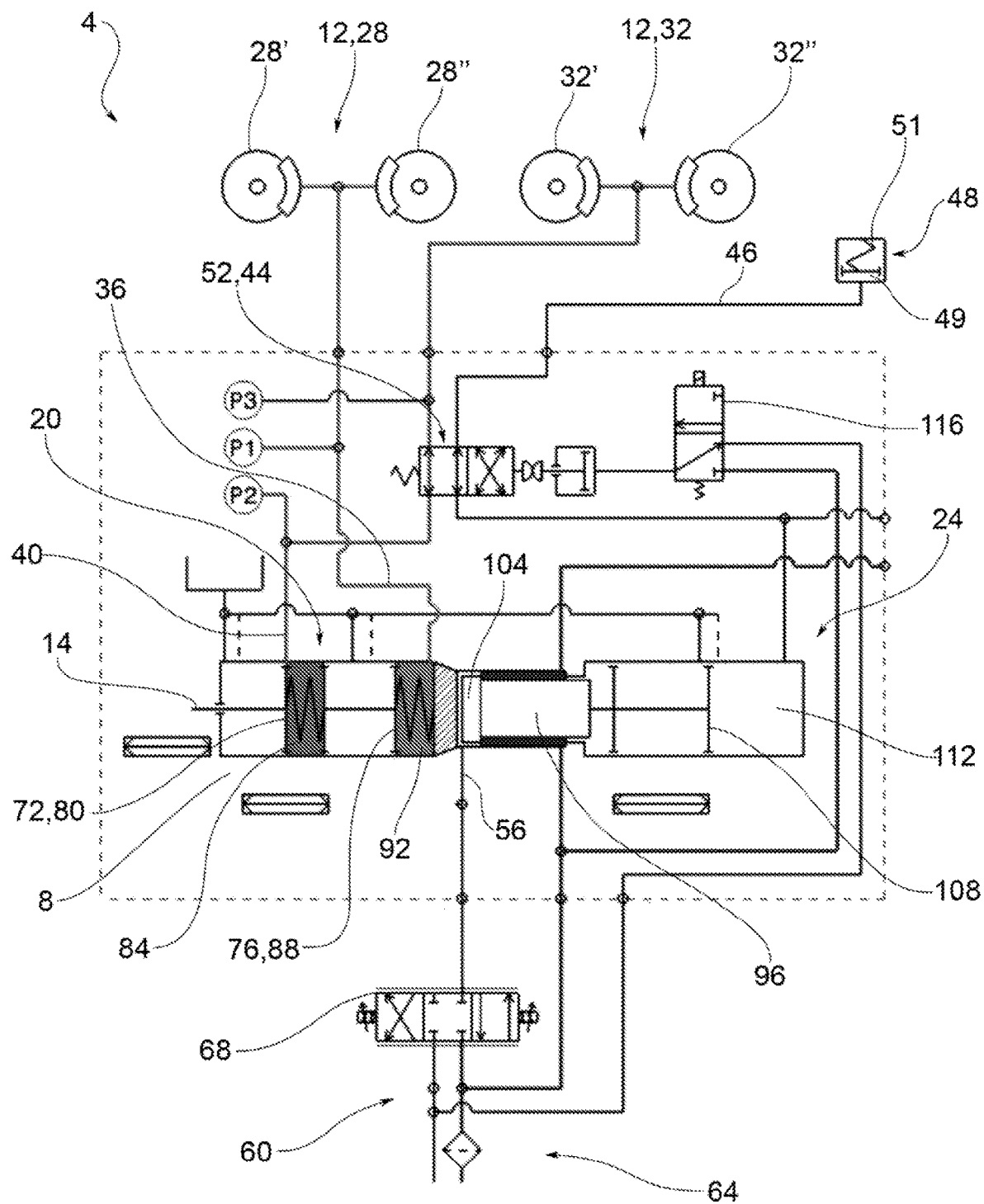
FIG. 7 shows a schematic view of a braking system of vehicles according to the present invention in a safety operating configuration.

In particular, as already mentioned, the braking system provides for two different operating conditions, defined as automatic operating condition (FIG. 6) and manual operating condition (FIG. 7).

In the automatic operating condition (FIG. 6), the first control valve 44 is operatively connected to the control unit 10 and is commanded thereby so that the pressurized brake fluid in the direct stage 40 of the first delivery circuit 20 is delivered to the braking simulator 48, fluidically disconnecting the direct stage 40 from the second braking device 32.

The user has control of the first braking device 28 by means of the indirect stage 36 which sends to the first braking device the fluid pressurized by the second float 76.

In other words, in this condition, the driver directly controls only a part of the braking system, through the indirect stage 36 of the pump body 16.

In the manual operating condition (FIG. 7), the first control valve 44 is operatively connected to the control unit 10 and commanded thereby so that the pressurized brake fluid in the direct stage 40 of the first delivery circuit 20 is sent to said second braking device 32, by-passing the closed branch 46 and the braking simulator 48, if present.

In other words, the first float 72 pressurizes the hydraulic fluid and directly commands the second braking device 32.

The user, moreover, continues to have control of the first braking device 28 by means of the indirect stage 36, which sends to the first braking device the fluid pressurized by the second float 76.

Therefore, in the manual operating condition, the user directly controls both the first and second braking device 28,32 through direct action on the manual actuation device 14.

As may be appreciated from the foregoing, the vehicle brake pump and braking system according to the invention allows the disadvantages of the prior art to be overcome.

In particular, the braking system of vehicles according to the present invention allows one to solve the technical contradiction of the systems of the prior art which consists in the fact that, to have the required performance, the mass of the components is too high, while to have acceptable mass, the components are unable to guarantee the required actuation power.

The proposed solution also allows the advantages of a hydraulic application to be exploited even on vehicles not equipped with high-pressure hydraulic systems: for such vehicles, in effect, it is possible to use a specific electro-hydraulic unit capable of pressurizing a fluid for actuating the actuators of the braking systems.

The braking system in accordance with the present invention guarantees safety conditions; in effect, in the event of malfunction of the automatic hydraulic actuation unit, the system automatically switches to the manual operating condition, i.e. a safety operating condition, wherein the direct manual control of the braking devices is guaranteed by the user through the actuation of the manual actuator device.

In standard conditions, i.e. in the automatic operating condition, the system guarantees "BBW"-type operation, i.e. "brake-by-wire" operation, so as to obtain reliable, powerful and fast braking that always satisfies the braking torque request that the user makes by actuating the manual actuator.

In addition, the present invention provides a simplified hydraulic plan with the same operating mode relative to BBW-type system solutions of the prior art.

In addition, the present invention provides a single component for all functions of the BBW system, including the driver-operated brake pump. In this way, the costs, weights and the overall dimensions of the braking system are reduced.

This solution also allows the driver brake pump to be incorporated and installed on the pedal unit, with the consequent simplification of the system.

The pump of the present invention has a particularly compact pump body which integrates both components for hydraulic operation and components for automatic brake-by-wire operation so as to considerably reduce the weight and dimensions with respect to the solutions of the prior art.

In effect, as described, the pump body integrates therein part of the first and second delivery circuit, the direct stage, the indirect stage, the first control valve, the input connection of the hydraulic actuation circuit, the third control valve, as well as, obviously, the first, second and third float.

Obviously, the system according to the present invention may be easily and advantageously integrated with other operational functions such as, for example, the automatic management of braking to avoid pneumatic locking phenomena (ABS).

A person skilled in the art, in the object of satisfying contingent and specific requirements, may make numerous modifications and variations to the hydraulic pumps and braking systems described above, all of which are within the scope of the invention as defined by the following claims.

The invention claimed is:

1. A brake pump for the braking system of vehicles having a pump body comprising:
   a first and a second delivery circuit fluidically connectable to at least a first and a second braking device,
   wherein the first delivery circuit comprises an indirect stage fluidically connectable to the first braking device and a direct stage intercepted by a first control valve, fluidically connectable alternately to a braking simulator and to said at least one second braking device so as to alternately connect the direct stage to the braking simulator or to said at least one second braking device for the actuation thereof, wherein the second delivery circuit is intercepted by said first control valve so as to actuate the second braking device alternately to the direct stage of the first delivery circuit, the pump body having an input connection to a hydraulic actuation circuit traversed by an actuation fluid different from a brake fluid and fluidically separated therefrom, wherein the pump body houses a first and a second float, wherein the first float is operatively connectable, in input, to a manual actuation device and said first and second floats are fluidically connected in output respectively to the direct and indirect stages of the first delivery circuit, wherein the pump body houses a third float operatively connected, in input, to the input connection of the hydraulic actuation circuit and, in output, to the second delivery circuit.

2. The brake pump for the braking system of vehicles according to claim 1, wherein the first and the second float are in series with each other and movable according to a respective first and second actuation stroke parallel to an axial direction.

3. The brake pump for the braking system of vehicles according to claim 1, wherein the third float is movable along a third actuation stroke parallel to an axial direction and offset with respect to a first and a second actuation stroke of the first and second float.

4. The brake pump for the braking system of vehicles according to claim 1, wherein the first float has a first pump head housed so as to slide in a first delivery volume of the pump body, the second float is provided with a second pump head housed so as to slide in a second delivery volume of the pump body, said first and second delivery volumes being fluidically separated from each other, the first and the second pump heads being in series with each other.

5. The brake pump for the braking system of vehicles according to claim 1, wherein the pump body delimits an actuation chamber, fluidically connected in input to the hydraulic actuation circuit and housing an actuation head of the third float mechanically connected to a third pump head of the third float, the third pump head being housed in a third delivery volume of the pump body connected in output to the second delivery circuit.

6. The brake pump for the braking system of vehicles according to claim 5, wherein the actuation chamber and the third delivery volume are fluidically separated from each other and filled with fluids different from each other.

7. The brake pump for the braking system of vehicles according to claim 5, wherein the actuation chamber is fluidically separated from the first and second delivery volume of the pump body.

8. The brake pump for the braking system of vehicles according to claim 1, wherein the first control valve comprises a diverter device which connects alternately and exclusively the direct stage of the first delivery circuit to the braking simulator or to the second braking device.

9. The brake pump for the braking system of vehicles according to claim 8, wherein the second delivery circuit comprises a third control valve, operatively connected to the control unit and commanded thereby so as to control the diverter device.

10. A braking system of vehicles, comprising:
a brake pump provided with a first and a second delivery circuit, containing the same brake fluid,
a first and a second braking device,
a closed branch, disconnected from said braking devices, wherein an indirect stage of the first delivery circuit is fluidically connected to the first braking device and a direct stage is intercepted by a first control valve fluidically connected alternately to the closed branch and to said second braking device so as to alternately connect the direct stage to the closed branch or to said at least one second braking device for the actuation thereof, an automatic hydraulic actuation unit operatively connected to a brake pump via a hydraulic actuation circuit traversed by an actuation fluid different from said brake fluid and fluidically separated therefrom, at least one control unit of the braking system which supervises the operation of the braking system, wherein a first float of a pump body is operatively connected, in input, to a manual actuation device, and the first float and a second float are fluidically connected, in output, respectively to the direct and indirect stages of the first delivery circuit, wherein the automatic hydraulic actuation unit comprises a second control valve operatively connected to the control unit and commanded thereby so as to control the movement of the third float generating the required pressure in a third delivery volume of the pump body connected in output to the second delivery circuit.

11. The braking system for vehicles according to claim 10, wherein the first control valve is operatively connected to the control unit and is controlled thereby so that, in an automatic operating condition, the pressurized brake fluid in the direct stage of the first delivery circuit is sent to said closed branch, fluidically disconnecting the direct stage from the second braking device.

12. The braking system for vehicles according to claim 10, wherein the first control valve is operatively connected to the control unit and controlled thereby so that, in a manual operating condition, the pressurized brake fluid in the direct stage of the delivery circuit is sent to said second braking device, by-passing a braking simulator.

13. The braking system for vehicles according to claim 10, wherein the automatic hydraulic actuation unit comprises a high-pressure pump suitable to pressurize the actuation fluid at a pressure at least double the pressure inside the direct and indirect stages of the first delivery circuit, to actuate a third float.

14. The braking system for vehicles according to claim 10, wherein a braking simulator is provided with a hydraulic pressure sensor operatively connected to the control unit to notify the latter of the request for a braking action by a user.

15. The braking system for vehicles according to claim 10, wherein a braking simulator comprises a storage tank of hydraulic fluid and elastic means to elastically oppose the first actuating stroke of the first float.

16. The braking system for vehicles according to claim 10, wherein the second delivery circuit comprises a third control valve, operatively connected to the control unit and commanded thereby so as to control a diverter device.

17. The braking system for vehicles according to claim 10, wherein the first and the second delivery circuits are fluidically connected to a pair of first braking devices arranged on a first axle of the vehicle and to a pair of second braking devices arranged on a second axle of the vehicle, respectively.

18. A braking system of vehicles, comprising:
a brake pump provided with a first and a second delivery circuit, containing the same brake fluid,
a first and a second braking device, a closed branch, disconnected from said braking devices, wherein an indirect stage of the first delivery circuit is fluidically connected to the first braking device and a direct stage is intercepted by a first control valve fluidically connected alternately to the closed branch and to said second braking device so as to alternately connect the direct stage to the closed branch or to said at least one second braking device for the actuation thereof, an automatic hydraulic actuation unit operatively connected to a brake pump via a hydraulic actuation circuit traversed by an actuation fluid different from said brake fluid and fluidically separated therefrom, at least one control unit of the braking system which supervises the operation of the braking system, wherein a first float of a pump body is operatively connected, in input, to a manual actuation device, and the first float and a second float are fluidically connected, in output, respectively to the direct and indirect stages of the first delivery circuit, wherein the first and the second delivery circuits are fluidically connected to a pair of first braking devices arranged on a first axle of the vehicle and to a pair of second braking devices arranged on a second axle of the vehicle, respectively.

* * * * *